(12) United States Patent
Diovardi et al.

(10) Patent No.: US 10,594,070 B2
(45) Date of Patent: Mar. 17, 2020

(54) VEHICLE MEDIA HUB ASSEMBLY

(71) Applicants: David J Diovardi, Northville, MI (US); David J Jaworski, Birmingham, MI (US)

(72) Inventors: David J Diovardi, Northville, MI (US); David J Jaworski, Birmingham, MI (US)

(73) Assignee: FCA US LLC, Auburn Hills, MI (US)

( * ) Notice: Subject to any disclaimer, the term of this patent is extended or adjusted under 35 U.S.C. 154(b) by 14 days.

(21) Appl. No.: 15/974,235

(22) Filed: May 8, 2018

(65) Prior Publication Data
US 2019/0348791 A1 Nov. 14, 2019

(51) Int. Cl.
| | |
|---|---|
| *H05K 5/00* | (2006.01) |
| *H01R 13/447* | (2006.01) |
| *F21V 23/04* | (2006.01) |
| *B60Q 3/20* | (2017.01) |
| *B60Q 3/80* | (2017.01) |
| *H01R 13/717* | (2006.01) |
| *H01R 13/66* | (2006.01) |
| *H01R 25/00* | (2006.01) |
| *F21W 106/00* | (2018.01) |
| *F21Y 115/10* | (2016.01) |

(52) U.S. Cl.
CPC ............ *H01R 13/447* (2013.01); *B60Q 3/20* (2017.02); *B60Q 3/80* (2017.02); *F21V 23/0471* (2013.01); *H01R 13/6683* (2013.01); *H01R 13/7172* (2013.01); *H01R 25/006* (2013.01); *F21W 2106/00* (2018.01); *F21Y 2115/10* (2016.08)

(58) Field of Classification Search
CPC ........................................................ H05K 5/00
See application file for complete search history.

(56) References Cited

U.S. PATENT DOCUMENTS

| | | | |
|---|---|---|---|
| 7,186,015 B2 | 3/2007 | Kimmet et al. | |
| 7,942,542 B1 | 5/2011 | Dunn | |
| 9,538,138 B2 | 1/2017 | Leete | |
| 2011/0266980 A1 | 11/2011 | Schellenberg | |
| 2014/0192002 A1 | 7/2014 | Herz et al. | |
| 2016/0149355 A1* | 5/2016 | Yeom ..................... | H01R 13/46 439/488 |

\* cited by examiner

*Primary Examiner* — Jerry Wu
(74) *Attorney, Agent, or Firm* — Ralph E. Smith

(57) ABSTRACT

A vehicle media hub assembly includes a housing having a display surface with an aperture, and a port disposed at least partially within the housing and extending into the aperture, the port configured to provide electrical and/or signal communication between two electrical devices. A lighting device is disposed within the aperture at least partially around the port. A door is coupled to the housing and movable between an open position providing access to the display surface, and a closed position covering the display surface. The door includes a window and a translucent cover at least partially covering the window. The window is configured to be disposed proximate the lighting device when the door is in the closed position such that light from the lighting device is configured to pass through the window and the translucent cover to illuminate at least a portion of the translucent cover.

20 Claims, 3 Drawing Sheets

VEHICLE MEDIA HUB ASSEMBLY

FIELD

The present application relates generally to media hubs and, more particularly, to a variably lit media hub assembly for a vehicle.

BACKGROUND

A universal serial bus (USB) cable provides an interface between a host device (e.g., a computer) and one or more peripheral devices (e.g., a cell phone). For example, the USB cable enables signal communication between the devices, as well as automatic configuration upon detection of the established interface. Additionally, USB cables often provide electrical power to the peripheral device. As such, the USB cable enables electrical or signal communication between electrical devices. With more and more electronic devices being utilized in or able to communicate with vehicles, it is desirable to provide one or more USB ports (or similar ports) to enable electrical and/or signal communication with such vehicles.

SUMMARY

In accordance with one example aspect of the disclosure, a media hub assembly is provided. The media hub assembly includes, in one exemplary implementation, a housing having a display surface with an aperture, and a port disposed at least partially within the housing and extending into the aperture, the port configured to provide electrical and/or signal communication between two electrical devices. A lighting device is disposed within the aperture at least partially around the port. A door is coupled to the housing and movable between an open position providing access to the display surface, and a closed position covering the display surface. The door includes a window and a translucent cover at least partially covering the window. The window is configured to be disposed proximate the lighting device when the door is in the closed position such that light from the lighting device is configured to pass through the window and the translucent cover to illuminate at least a portion of the translucent cover.

In addition to the foregoing, the described media hub assembly may include one or more of the following: a magnet disposed within the door, and a sensor disposed within the housing, the sensor configured to determine when the door is in the closed position based on proximity to the magnet; a metallic arm coupled to the housing and operably coupled to the sensor; wherein the translucent cover has an opaque coating disposed thereon, and at least one graphic is etched into at least one of the translucent cover and the opaque coating, wherein light emitted from the lighting device illuminates the at least one graphic; and wherein the lighting device is a dimmable lighting device configured to provide various degrees of luminance.

In addition to the foregoing, the described media hub assembly may include one or more of the following: wherein the housing includes an inner housing at least partially received within an outer housing; wherein the inner housing includes an upper shell coupled to a lower shell; wherein the port is a USB port and the lighting device is an LED; and wherein the display surface aperture includes four apertures, wherein the port includes four ports each in one of the four apertures, and wherein the lighting device is disposed within each aperture around the port in each aperture.

In accordance with another example aspect of the disclosure, a vehicle is provided. The vehicle includes a power source, in one exemplary implementation, an interior component, and a media hub assembly disposed in the interior component and in electrical communication with the power source. The media hub assembly includes a housing having a display surface with an aperture, and a port disposed at least partially within the housing and extending into the aperture, the port configured to provide electrical and/or signal communication between two electrical devices. A lighting device is disposed within the aperture at least partially around the port. A door is coupled to the housing and movable between an open position providing access to the display surface, and a closed position covering the display surface. The door includes a window and a translucent cover at least partially covering the window. The window is configured to be disposed proximate the lighting device when the door is in the closed position such that light from the lighting device is configured to pass through the window and the translucent cover to illuminate at least a portion of the translucent cover.

In addition to the foregoing, the described vehicle may include one or more of the following: wherein the vehicle component is an instrument panel; a magnet disposed within the door, and a sensor disposed within the housing, the sensor configured to determine when the door is in the closed position based on proximity to the magnet; a metallic arm coupled to the housing and operably coupled to the sensor; and wherein the translucent cover has an opaque coating disposed thereon, and at least one graphic is etched into at least one of the translucent cover and the opaque coating, wherein light emitted from the lighting device illuminates the at least one graphic.

In addition to the foregoing, the described vehicle may include one or more of the following: wherein the lighting device is a dimmable lighting device configured to provide various degrees of luminance; wherein the housing includes an inner housing at least partially received within an outer housing; wherein the inner housing includes an upper shell coupled to a lower shell; wherein the port is a USB port; and wherein the display surface aperture includes four apertures, wherein the port includes four ports each in one of the four apertures, and wherein the lighting device is disposed within each aperture around the port in each aperture.

Further areas of applicability of the teachings of the present application will become apparent from the detailed description, claims and the drawings. It should be understood that the detailed description, including disclosed embodiments and drawings referenced therein, are merely exemplary in nature intended for purposes of illustration only and are not intended to limit the scope of the present application, its application or uses. Thus, variations that do not depart from the gist of the present application are intended to be within the scope of the present application.

DESCRIPTION

The present application is directed to systems and methods for a vehicle media hub assembly with variable lighting. The media hub assembly includes a door with symbols/graphics etched into the door. When the door is open, ports are exposed for plugging in a cord to connect a peripheral device to the vehicle. An outer perimeter of each port is illuminated by a light. When the door is closed, the light intensity is increased to backlight the symbols/graphics etched into the door.

Figure 1:
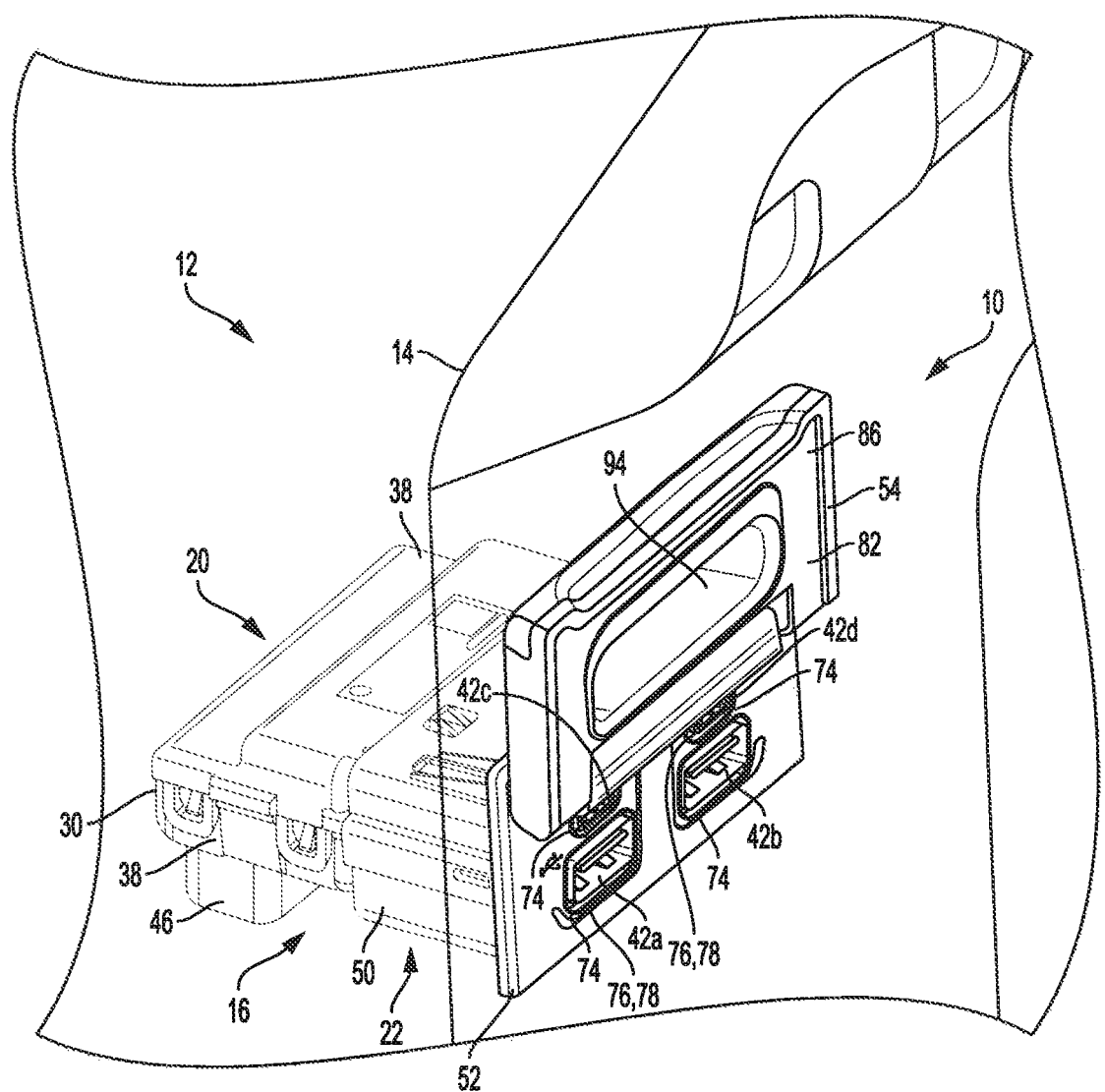
FIG. 1 is a perspective view of an example media hub assembly disposed within a vehicle, in accordance with the principles of the present application.

Referring to FIG. 1, an example media hub assembly for a vehicle 12 is generally shown and indicated at reference numeral 10. In the illustrated embodiment, media hub assembly 10 is installed in an instrument panel 14 of the vehicle 12 between driver and passenger seats (not shown). Such an arrangement provides access to both the driver and front passenger. However, it will be appreciated that media hub assembly 10 can be disposed in various locations throughout the vehicle 12 such as, for example, in a second or third row seating, a center console, a seat back, a rear cargo area, or other area in the vehicle. As such, media hub assembly 10 is configured for location throughout a vehicle to provide electrical and/or signal connection to a vehicle power system (e.g., a car battery) and/or other vehicle system (e.g., an audio player).

Figure 2:
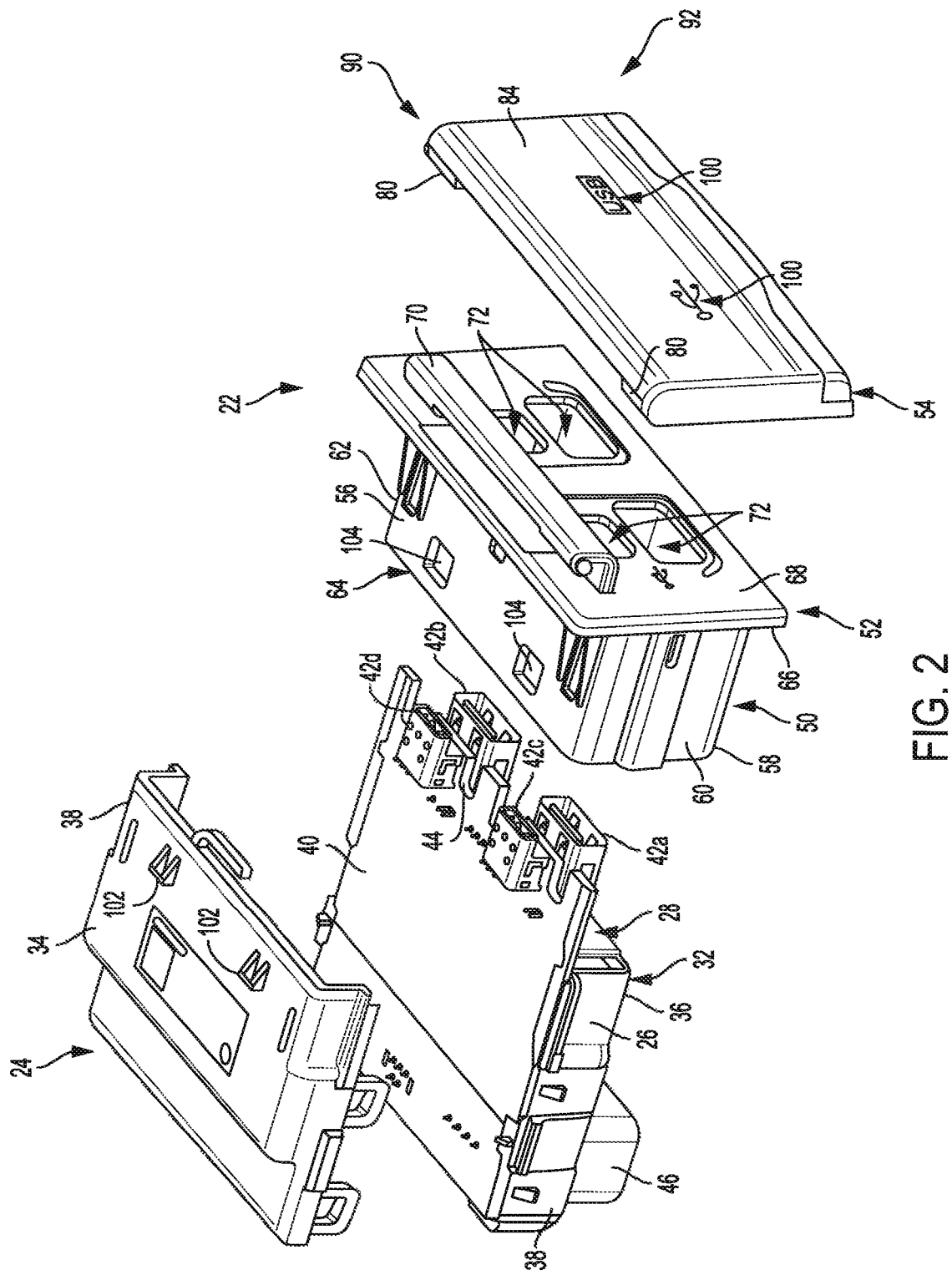
FIG. 2 is an exploded view of the media hub assembly shown in FIG. 1, in accordance with the principles of the present application.

With further reference to FIG. 2, media hub assembly 10 generally includes an inner housing 20 and an outer housing 22. In the example embodiment, inner housing 20 generally includes an upper shell 24 and a lower shell 26 configured to couple together and form a cavity or enclosure 28. The inner housing 20 includes a forward end 30, a rearward end 32, a top surface 34, a bottom surface 36, and opposed sides 38 (only one shown). In the example shown in FIG. 1, forward end 30 is configured for insertion into instrument panel 14 toward a front of the vehicle, and the rearward end 32 is configured to be disposed toward a rear of the vehicle relative to the forward end 30.

In the example embodiment, inner housing 20 is configured to at least partially house various components such as a PCB 40 having a plurality of electrical ports 42a-d and one or more LEDs 44.

In the example implementation, inner housing rearward end 32 is open such that PCB 40 and ports 42a-d extend outwardly from enclosure 28. The electrical ports 42a-d are in signal/electrical communication with one or more additional ports (not shown) such as USB Mini A to connect to other vehicle systems (not shown). In the illustrated example, such additional ports are disposed in the bottom surface 36 of forward end 30 within one or more connector guides 46. In this way, inner housing 20 is configured for quick and easy insertion into a module receptacle 16 formed in the instrument panel 14 (or other vehicle component) to establish an electrical/signal connection between media hub assembly 10 and the vehicle 12.

In the example embodiment, electrical ports 42a and 42b are USB type-A ports, and electrical ports 42c and 42d are USB type-C ports. However, it will be appreciated that media hub assembly 10 may include any number and/or type of port that enables assembly 10 to establish an electrical and/or signal communication between two devices. Ports 42 are configured to receive a plug of a cable or other device (not shown) to establish a connection with a device coupled thereto (e.g., a smart phone, tablet, or other electronic device).

In the example embodiment, the outer housing 22 generally includes a sleeve 50, a panel or display surface 52, and a door 54. Sleeve 50 generally includes a top wall 56, a bottom wall 58, and opposed side walls 60, 62 extending therebetween to define a generally hollow receiving area 64. As shown in FIGS. 1 and 2, sleeve 50 is generally rectangular and is configured to at least partially receive inner housing 20. Sleeve 50 is configured to releasably couple to inner housing 20, for example, via inner housing retention tabs 102 removably received within apertures 104 formed in walls 56, 58 (see FIG. 2).

In the illustrated example, display surface 52 is a generally plate-like member having an inner surface 66 and an opposite outer surface 68. When assembled, inner surface 66 is disposed against or proximate inner housing rearward end 32. An inner hinge member 70 extends outwardly from outer surface 68 and is configured to facilitate hingedly coupling door 54 to the display surface 52. A plurality of windows 72 are formed through display surface 52, and one or more light tubes or guides 74 are disposed within hollow receiving area 64 against inner surface 66.

In the example embodiment, the light guides 74 include a tubular portion 76 that defines a racetrack or outer perimeter 78 around each window 72. In the example embodiment, the light guides 74 are received in windows 72, and the light guide tubular portions 76 are each configured to receive one of ports 42a-d therethrough. As such, the light guides 74 are configured to direct light from the LEDs 44 to illuminate a pattern or perimeter 78 around each port 42 and thereby provide visual identification of and insertion guidance for individual ports 42.

With continued reference to FIGS. 1 and 2, door 54 is hingedly coupled to display surface 52 via outer hinge members 80, which rotatably couple to hinge member 70. However, door 54 may be coupled to display surface 52 in any suitable manner that enables assembly 10 to function as described herein. Door 54 is configured to move between an open position (e.g., FIG. 1) providing access to ports 42, and a closed position (e.g., similar to FIG. 2) to protect and/or conceal ports 42.

Figure 3:
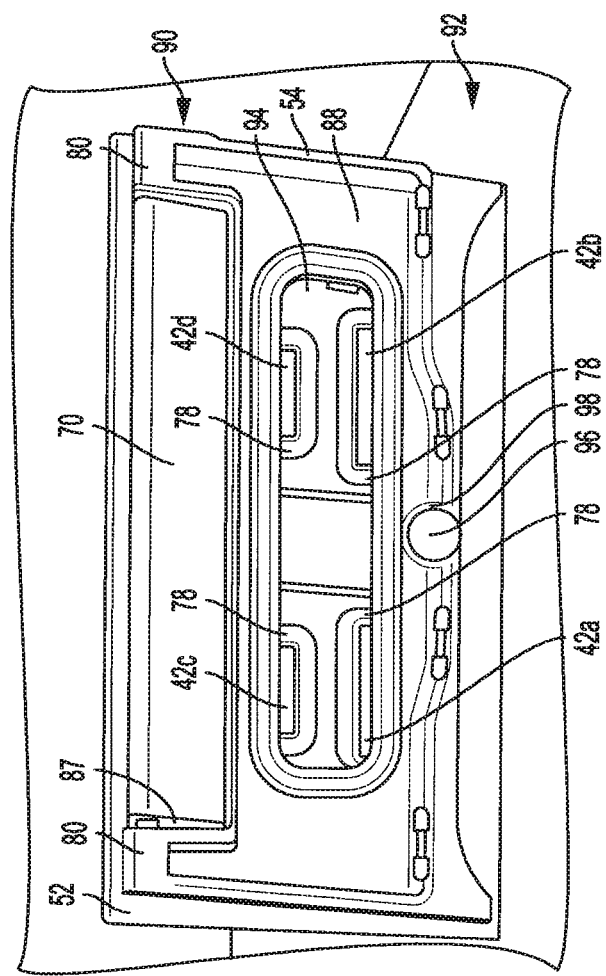
FIG. 3 is a front view of the media hub assembly shown in FIG. 1 with a translucent cover removed, in accordance with the principles of the present application.

With additional reference to FIG. 3, door 54 generally includes a main body 82 and a translucent cover 84 (removed in FIG. 3) coupled thereto. The main body 82 is generally rectangular and includes an inner surface 86, an opposite outer surface 88, a top end 90, and a bottom end 92. The main body 82 is sized and shaped to cover display surface 52 when in the closed position. A recess or relief 87 is formed in main body top end 90 to provide clearance for hinge member 70 as door 54 moves between the open and closed positions.

In the example embodiment, a window 94 is formed through main body 82. As shown in FIG. 3, the window 94 is configured to be disposed about or proximate the illuminated light guide perimeters 78 when door 54 is in the closed position. In the illustrated example, a magnet (e.g., permanent magnet) 96 is disposed within a receiving aperture 98 formed in main body bottom end 92.

The translucent cover 84 is configured to couple to the main body outer surface 88 over both the window 94 and magnet 96. In the example embodiment, the translucent cover 84 is fabricated from a translucent material and subsequently coated with an opaque material (e.g., paint). One or more symbols or graphics 100 are then formed or etched into the coating/cover to thereby define the particular symbol/graphic on the translucent cover 84. In the example embodiment, symbols/graphics 100 are symbols/graphics representing a USB connection. As such, light emanating from the light guide perimeters 78 subsequently travels through window 94 and translucent cover 84 to illuminate the symbols/graphics 100 when the door 54 is in the closed position.

Figure 4:
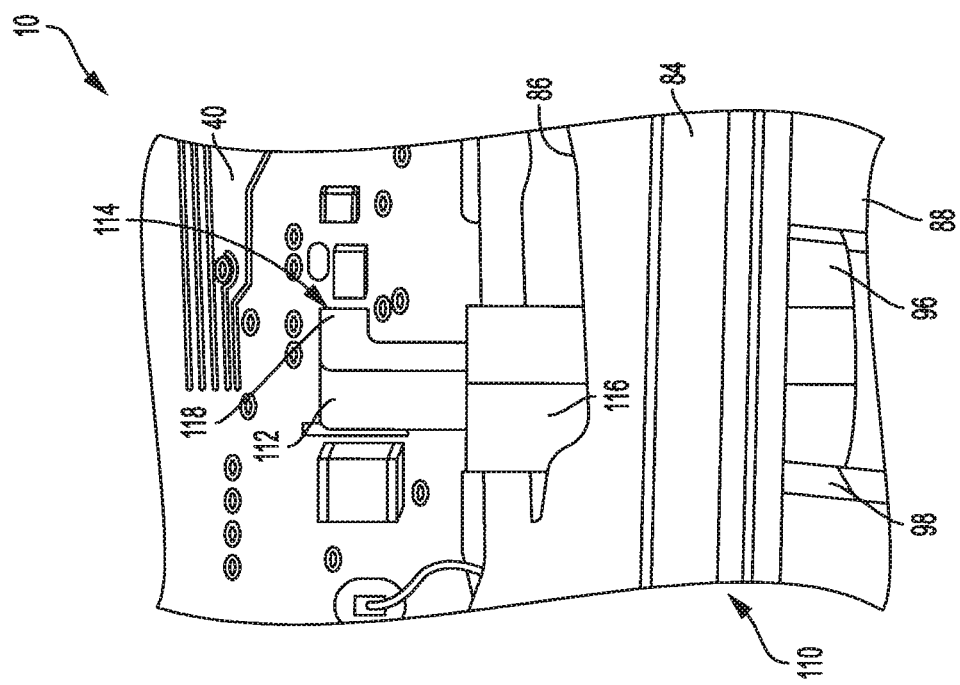
FIG. 4 is an enlarged view of the media hub assembly shown in FIG. 1 with portions removed, in accordance with the principles of the present application.

With further reference to FIG. 4, in the example implementation, media hub assembly 10 also includes an automatic dimming system 110 configured to automatically dim/brighten the LEDs 44 based on the position of door 54. In the example embodiment, automatic dimming system 110 generally includes magnet 96, a metallic arm 112, and a sensor 114 (e.g., a Hall sensor).

Metallic arm 112 is generally L-shaped and includes a proximal end 116 and a distal end 118. Proximal end 116 is coupled to display surface 52 behind outer surface 68 and extends outwardly from inner surface 66 toward PCB 40. Distal end 118 is in contact with or operably associated with sensor 114. As shown in FIG. 4, magnet 96 is disposed proximate the metallic arm proximal end 116 when door 54 is in the closed position, which creates a detectable magnetic field or force at metallic arm distal end 118.

Sensor 114 is configured to detect when magnet 96 is positioned next to metallic arm 112 (i.e., when the door 54 is closed) and subsequently send a "closed" signal (or lack of signal) indicating that door 54 is in the closed position. In the example embodiment, because luminance is lost traveling through translucent cover 84, upon detecting the magnetic field from magnet 96 (e.g., via arm 112), sensor 114 switches current to the LEDs 44 for increased luminance. In this way, when door 54 is closed, the symbols/graphics 100 are illuminated by the LEDs 44 to have the same luminance as the light guide perimeter 78 when the door 54 is in the open position, for example, in order to match the luminance of light guide perimeter 78 (or the rest of the vehicle interior lights).

When sensor 114 does not detect magnet 96 positioned next to metallic arm 112 (i.e., when the door 54 is open), an "open" signal (or lack of signal) indicating that door 54 is in the open position. In the example embodiment, because the light no longer must travel through translucent cover 84, when the magnetic field from magnet 96 is no longer detected, sensor 114 switches the current to LEDs 44 to decrease the luminance thereof.

The luminance of LEDs 44 can be automatically increased/decreased by a predetermined factor based on the type of material of translucent cover 84 and/or the luminance lost as light travels therethrough. In one example, LEDs 44 emit a luminance ten times or substantially ten times brighter when the door 54 is closed than when the door 54 is open. In other examples, when door 54 is closed, LEDs 44 are illuminated to between approximately 6 FL (foot luminance) and approximately 10 FL, or between 6 FL and 10 FL. When door 54 is open, LEDs 44 are illuminated to between approximately 0.6 FL and approximately 1.0 FL, or between 0.6 FL and 1.0 FL. In still other embodiments, when door 54 is closed, LEDs 44 are illuminated to 8 FL or approximately 8 FL. When door 54 is open, LEDs 44 are illuminated to 0.8 FL or approximately 0.8 FL.

Additionally, in one example embodiment, magnet 96, metallic arm 112, and sensor 114 are utilized to provide a mechanical lock for door 54. For example, a predetermined magnetic force can be generated in outer housing 22 to magnetically attract magnet 96 to maintain door 54 in the closed position and prevent opening thereof up to a predetermined opening force.

Described herein are systems and methods for a media hub for a vehicle. The systems include a module will a plurality of USB ports and a door to cover the ports. When the door is open, a lighting device lights an area at least partially around the ports. When the door is closed, a metallic disc in the door is sensed by a magnet in the media hub housing which switches the lighting device to backlight USB symbols molded and etched into the door. As such, the same lighting device is utilized to illuminate a perimeter of the ports as well as the symbols in the door. The lighting device is designed to switch to a relatively dimmer first predetermined luminance when the door is opened, and a relatively brighter second predetermined luminance when the door is closed. Both opened and closed door lighting scenarios are supported by a multi-step vehicle interior light dimming feature.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. A media hub assembly comprising:
   a housing having a display surface with an aperture;
   a port disposed at least partially within the housing and extending into the aperture, the port configured to provide electrical and/or signal communication between two electrical devices;
   a lighting device disposed within the aperture at least partially around the port; and
   a door coupled to an inner hinge extending outwardly from the display surface of the housing and movable between an open position providing access to the display surface, and a closed position covering the display surface;
   wherein the door includes a window and a translucent cover at least partially covering the window, and wherein the window is configured to be disposed proximate the lighting device when the door is in the closed position such that light from the lighting device is configured to pass through the window and the translucent cover to illuminate at least a portion of the translucent cover.

2. The assembly of claim 1, wherein the translucent cover has an opaque coating disposed thereon, and at least one graphic is etched into at least one of the translucent cover and the opaque coating, and
   wherein light emitted from the lighting device illuminates the at least one graphic.

3. The assembly of claim 2, wherein the lighting device is a dimmable lighting device configured to provide various degrees of luminance.

4. The assembly of claim 3, wherein the lighting device includes a first amount of light intensity and a second amount of light intensity greater than the first amount; and
   wherein when the door is in the open position, the lighting device provides light at the first amount of light intensity, and when the door is in the closed position, the lighting device provides light at the second amount of light intensity to illuminate the at least one graphic.

5. The assembly of claim 1, further comprising a magnet disposed within the door, and a sensor disposed within the housing, the sensor configured to determine when the door is in the closed position based on proximity to the magnet.

6. The assembly of claim 5, further comprising a metallic arm coupled to the housing and operably coupled to the sensor.

7. The assembly of claim 1, wherein the housing includes an inner housing at least partially received within an outer housing, and wherein the inner housing includes an upper shell coupled to a lower shell.

8. The assembly of claim 1, wherein the port is a USB port and the lighting device is an LED.

9. The assembly of claim 1, wherein the display surface aperture includes four apertures,
wherein the port includes four ports each in one of the four apertures, and
wherein the lighting device is disposed within each aperture around the port in each aperture.

10. A vehicle comprising:
a power source;
an interior component; and
a media hub assembly disposed in the interior component and in electrical communication with the power source, the media hub assembly comprising:
a housing having a display surface with an aperture;
a port disposed at least partially within the housing and extending into the aperture, the port configured to provide electrical and/or signal communication between two electrical devices;
a lighting device disposed within the aperture at least partially around the port; and
a door coupled to an inner hinge extending outwardly from the display surface of the housing and movable between an open position providing access to the display surface, and a closed position covering the display surface;
wherein the door includes a window and a translucent cover at least partially covering the window, and wherein the window is configured to be disposed proximate the lighting device when the door is in the closed position such that light from the lighting device is configured to pass through the window and the translucent cover to illuminate at least a portion of the translucent cover.

11. The vehicle of claim 10, wherein the interior component is an instrument panel.

12. The vehicle of claim 10, further comprising a magnet disposed within the door, and a sensor disposed within the housing, the sensor configured to determine when the door is in the closed position based on proximity to the magnet.

13. The vehicle of claim 12, further comprising a metallic arm coupled to the housing and operably coupled to the sensor.

14. The vehicle of claim 10, wherein the translucent cover has an opaque coating disposed thereon, and at least one graphic is etched into at least one of the translucent cover and the opaque coating,
wherein light emitted from the lighting device illuminates the at least one graphic.

15. The vehicle of claim 10, wherein the lighting device is a dimmable lighting device configured to provide various degrees of luminance.

16. The vehicle of claim 10, wherein the housing includes an inner housing at least partially received within an outer housing.

17. The vehicle of claim 16, wherein the inner housing includes an upper shell coupled to a lower shell.

18. The vehicle of claim 10, wherein the port is a USB port.

19. The vehicle of claim 10, wherein the display surface aperture includes four apertures,
wherein the port includes four ports each in one of the four apertures, and
wherein the lighting device is disposed within each aperture around the port in each aperture.

20. A media hub assembly comprising:
a housing having a display surface with an aperture;
a port disposed at least partially within the housing and extending into the aperture, the port configured to provide electrical and/or signal communication between two electrical devices;
a lighting device disposed within the aperture at least partially around the port; and
a door coupled to the housing and movable between an open position providing access to the display surface, and a closed position covering the display surface;
wherein the door includes a window and a translucent cover at least partially covering the window, and wherein the window is configured to be disposed proximate the lighting device when the door is in the closed position such that light from the lighting device is configured to pass through the window and the translucent cover to illuminate at least a portion of the translucent cover;
wherein the translucent cover has an opaque coating disposed thereon, and at least one graphic is etched into at least one of the translucent cover and the opaque coating, and wherein light emitted from the lighting device illuminates the at least one graphic;
wherein the lighting device is a dimmable lighting device configured to provide various degrees of luminance;
wherein the lighting device includes a first amount of light intensity and a second amount of light intensity greater than the first amount; and
wherein when the door is in the open position, the lighting device provides light at the first amount of light intensity, and when the door is in the closed position, the lighting device provides light at the second amount of light intensity to illuminate the at least one graphic.

* * * * *